Patented July 7, 1931

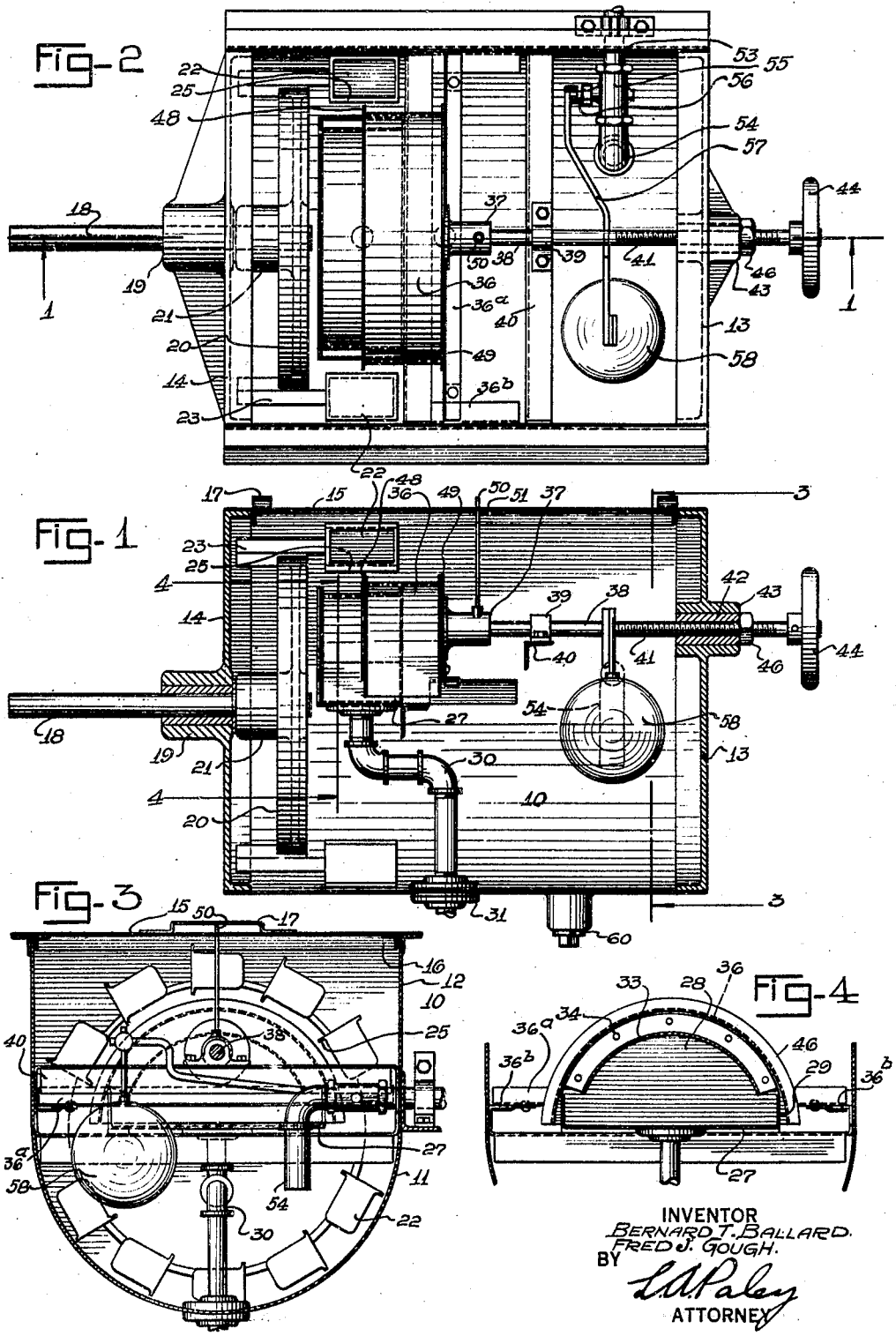

1,813,834

UNITED STATES PATENT OFFICE

BERNARD T. BALLARD AND FRED J. GOUGH, OF FORT DODGE, IOWA, ASSIGNORS TO UNITED STATES GYPSUM COMPANY, OF CHICAGO, ILLINOIS, A CORPORATION OF ILLINOIS

LIQUID MEASURING APPARATUS

Application filed January 30, 1930. Serial No. 424,626.

This invention relates to a liquid measuring apparatus, and has reference more particularly to an apparatus of the rotating dipper type, having an adjustable means for varying the liquid flow.

In various manufacturing processes, it is often desirable to have a liquid fed at a uniform rate and to have this rate of flow accurately adjusted and capable of minute changes between given limits. Among the uses where such a measuring apparatus is desirable is in the supply of foam-producing liquids to a foam cell or beater, the foam being later mixed with a cementitious material, such as gypsum prior to setting for the purpose of producing a light weight product. Other uses for an apparatus of the present invention are in the handling of corrosive liquids containing sediment or scale, such as caustic soda and bleach liquors used in paper mills. The apparatus is also useful in measuring liquids used in flotation apparatus in the mining industry.

An object of this invention, therefore, is to provide an apparatus for accurately measuring liquids so that a uniform and minutely adjustable rate of discharge of liquid from the apparatus is obtained; also to improve liquid measuring apparatus in other respects hereinafter specified and claimed.

Reference is to be had to the accompanying drawings forming a part of this specification, in which Fig. 1 is a central, sectional elevation through the liquid measuring apparatus, Fig. 2 is a plan view of the apparatus with cover removed, Fig. 3 is a sectional elevation through the apparatus, taken on the line 33 of Fig. 1, and Fig. 4 is a sectional elevation through the apparatus on the line 44, of Fig. 1.

The apparatus consists of a solution casing or container 10 which may be of any suitable construction, but in the preferred form, it includes a semi-cylindrical bottom 11 integrally connected to a hopper 12 which is substantially rectangular in cross section. Suitable shaped cast ends 13 and 14 close the ends of the solution container 10 and a cover 15 is placed on top of the container, said cover being provided with a depending peripheral flange 16 extending around the inside of the container. The cover is provided with a handle 17 so that the former can be readily removed for inspection of the apparatus contained in the container.

A shaft 18 passes through a bearing 19 formed on the container end 14, said shaft being driven continuously by any suitable source of power, such as electric motor not shown. A wheel 20 is arranged in the container 10 being provided with a hub 21 rigidly secured to the shaft 18. A series of dippers or cups 22 is rigidly secured around the periphery of wheel 20 by means of brackets 23, said dippers being arranged to dip below the surface of the liquid to be measured which is contained in the container 10. The dippers 22 are preferably rectangular in cross section and are provided with outstanding flanges 25 formed around the open periphery of the cups for the purpose of strengthening the walls thereof and for insuring a uniform discharge of liquid over the full width of each dipper.

A tray 27 provided with semi-cylindrical ends 28 and upturned edges 29, is mounted so as to receive the liquid discharged from the dippers 22 as they rise to their uppermost position on the wheel 20. A drain pipe 30 is secured to the bottom of the tray 27, said drain pipe passing through connection 31 on the bottom of the container 10. The pipe 30 leads to any suitable discharge point such as a foam cell, as previously mentioned for whipping the liquid into a foam, later to be used for mixing with cementitious material to make same light in weight. In order to prevent the liquid from prematurely producing a foam in the measuring apparatus, we provide a semi-circular stationary shield 33 secured between the tray ends 28, as by rivets 34. The liquid flowing over the lower edge of dippers 22 falls onto this shield, and flows quietly down the shield into the tray 27 without forming foam. The lower edges of the shield 33 are disposed a short distance inwardly from the upturned ends 29 of the tray 27, so that the liquid is discharged into said tray.

In order to vary the flow of liquid through the discharge pipe 30, we provide a semi-circular adjusting shield 36 which is slidably mounted above the shield 33 and tray 27. The adjusting shield 36 is secured to a cross member 36a having its ends slidably received on slides 36b and said shield also has a hub 37 formed on one end thereof, said hub being arranged to rotatably receive the inner end of a screw spindle 38. The spindle 38 is rotatably supported inside the container 10 by means of a bearing 39 secured to a cross brace 40, and the outer end of said spindle is provided with a threaded section 41 which passes outwardly through an internally threaded bushing 42 secured in a hub 43 formed in the container end 13. The extreme outer end of the spindle 38 is provided with a hand wheel 44 so that the spindle can be manually operated to move the adjusting shield 36 longitudinally of said spindle for adjusting discharge or flow of liquid from the apparatus. A lock nut 46 is provided on the spindle 38 to prevent accidental rotation of said spindle and hand wheel 44. The adjustable shield 36 is provided with a semi-circular knife edge 48 which can be moved back and forth under the rotating dippers so that the stream of liquid flowing from said dippers is cut into two parts, one part which flows into the tray 27 and then through the discharge pipe 30, and the other stream which flows down the face of the adjustable shield 36 back into the container 10. The amount of liquid flowing from the apparatus can thus be regulated with minute accuracy by rotation of the screw 38 so that the exact amount of liquid desired is caused to flow from the discharge pipe 30. A semi-circular flange 49 is provided along the edge of the adjustable shield 36 opposite the knife edge 48 so as to prevent any liquid from spilling over said edge of the adjustable shield. An indicating pointer 50 extends upwardly through a slot 51 formed in the cover 15, the upper end of said pointer indicating the position of the adjustable shield 48 and therefore indicating the amount of liquid being discharged from the apparatus. A suitable scale may be provided adjacent the upper edge of pointer 50 for the purpose of indicating the flow of liquid from the pipe 30.

It is desired to continuously introduce liquid into the container 10 and to control the level of liquid therein, and for this purpose an inlet pipe 53 leads from any source of supply such as tank not shown, said pipe 53 having an end 54 which extends downwardly below the normal liquid level in the container 10. A valve 55 is provided on the pipe 53 and the stem 56 of said valve is rotated and controlled by means of an arm 57 secured to the end thereof, said arm being provided on its extreme end with a hollow float 58 of standard construction. Thus, the float 58 rises and falls with the liquid level in the container 10 and opens or closes the valve 55 to maintain a uniform liquid level. A suitable drain plug 60 is provided in the bottom of the container 10 for draining the liquid from the container if so desired. If desired, suitable mechanism may be provided to hold the shield 36 stationary and move the tray 27 so as to vary the liquid flow from the apparatus. Also the dippers may be moved relative to the knife edge 48 so as to vary the flow.

In operation, the liquid to be measured flows into the container 10 through pipe 53, the level of liquid in said container being maintained constant by means of float 58 controlling inlet valve 55. The shaft 18 is continuously rotated so that the dippers 22 dip up liquid from the container 10. As the dippers 22 move to their uppermost position, the liquid flows over the lower edge 25 of each dipper in a stream of uniform thickness. The knife edge 48 formed on the adjustable shield 36 cuts the stream from the dippers into two parts, one part which flows onto the shield 33 and then down into tray 27 to be discharged from the apparatus through pipe 30, and the other stream which flows down the adjustable shield 36 and back into the container to be recirculated. The handle 44 and screw 38 are rotated to move the adjustable shield 36 axially of said screw 38 and thus regulate the amount of liquid flowing from the apparatus with minute accuracy. The rate of flow of liquid from the apparatus is indicated by the upper end of pointer 50 which extends through the slot 51 in the container cover 15.

We would state in conclusion that while the illustrated example constitutes a practical embodiment of our invention, we do not wish to limit ourselves precisely to these details, since manifestly, the same may be considerably varied without departing from the spirit of the invention as defined in the appended claim.

Having thus described our invention, we claim as new and desire to secure by Letters Patent:

In a liquid measuring apparatus, a container for liquid to be measured, a series of dippers adapted to rotate and dip liquid from said container, and then discharge the liquid from said dippers, a tray for receiving a portion of the discharge of liquid from said dippers, a shield slidably mounted above said tray, a knife edge associated with said shield, the knife edge being adapted to split the stream flowing from said dippers and thus cause a portion of said liquid to be discharged into said tray and the other portion of said liquid to be returned to the container, and means for accurately adjusting the position of said shield relative to said dippers, so as to vary the amount of liquid flowing from said container.

BERNARD T. BALLARD.
FRED J. GOUGH.